US008838482B2

(12) United States Patent
Schindler et al.

(10) Patent No.: US 8,838,482 B2
(45) Date of Patent: Sep. 16, 2014

(54) METHOD FOR THE PRODUCTION OF PRINTED ITEMS OF CLOTHING MADE FROM TEXTILE MATERIAL

(75) Inventors: Bastian Schindler, Regensburg (DE); Francisco Jose Gennes Sanchez, Regensburg (DE); Paul Marek, Regensburg (DE)

(73) Assignee: Owayo GmbH, Regensburg (DE)

( * ) Notice: Subject to any disclaimer, the term of this patent is extended or adjusted under 35 U.S.C. 154(b) by 1252 days.

(21) Appl. No.: 10/515,718

(22) PCT Filed: May 23, 2003

(86) PCT No.: PCT/EP03/05426
§ 371 (c)(1),
(2), (4) Date: May 31, 2005

(87) PCT Pub. No.: WO03/099052
PCT Pub. Date: Dec. 4, 2003

(65) Prior Publication Data
US 2005/0240416 A1 Oct. 27, 2005

(30) Foreign Application Priority Data
May 25, 2002 (DE) .................................. 102 23 375

(51) Int. Cl.
*G06Q 30/00* (2012.01)
(52) U.S. Cl.
USPC ........................... 705/26.5; 700/131; 700/235
(58) Field of Classification Search
USPC ........................... 705/26.5; 700/131, 233, 235
See application file for complete search history.

(56) References Cited

U.S. PATENT DOCUMENTS 2,030,026 A 2/1936 Golding
3,805,650 A 4/1974 Pearl
(Continued)

FOREIGN PATENT DOCUMENTS

DE 199 51 511 10/1999
EP 0 801 905 10/1997
(Continued)

OTHER PUBLICATIONS http://webpages.eng.wayne.edu/~af2604/be1010/excel.html, 10 pages.*

(Continued)

*Primary Examiner* — Kira Nguyen
(74) *Attorney, Agent, or Firm* — Dorsey & Whitney LLP

(57) ABSTRACT

A method of making a printed article of clothing of fabric, characterized by the following steps:
(a) a computer (4) of a customer (2) is connected for data exchange with a computer (12) of a producer;
(b) the customer (2) sets the design of a desired article of clothing via the customer computer (4)/producer computer (12) connection by setting for a plurality of design parameters (e.g. basic design, color, size) a respective selection target from several selection targets possible;
(c) based on data from said design setting, several print parts are printed on a printing medium by means of a printer (12), said printing medium being either directly a fabric panel or an intermediate medium the print of which is transferred to fabric later on;
(d) fabric pieces (24a; 24b) (e.g. chest piece, back piece, sleeve piece) are cut out from a fabric panel, in which the fabric panel either originates from direct printing, or the fabric panel originates from the print transfer from the intermediate medium,
or the fabric panel is unprinted and the cut fabric pieces are subjected to the print transfer later on;
(e) and several fabric pieces (24a; 24b) are sewn together to form the article of clothing.

47 Claims, 7 Drawing Sheets

(56) References Cited

U.S. PATENT DOCUMENTS

| | | | |
|---|---|---|---|
| 3,895,358 A | | 7/1975 | Pearl |
| 4,136,452 A | | 1/1979 | McMillan |
| 4,873,643 A | * | 10/1989 | Powell et al. ................. 700/103 |
| 4,905,159 A | * | 2/1990 | Loriot ........................... 700/134 |
| 5,324,378 A | * | 6/1994 | Sieber ........................... 156/240 |
| 5,487,614 A | | 1/1996 | Hale |
| 5,495,568 A | | 2/1996 | Beavin |
| 5,727,433 A | | 3/1998 | Pomerleau et al. |
| 5,975,743 A | * | 11/1999 | Bercaits ........................ 700/134 |
| 6,095,628 A | | 8/2000 | Rhome |
| 6,173,211 B1 | * | 1/2001 | Williams et al. .............. 700/131 |
| 6,243,110 B1 | | 6/2001 | Takahashi et al. ................ 347/5 |
| 6,314,585 B1 | | 11/2001 | Mann |
| 6,353,770 B1 | | 3/2002 | Ramsey et al. ............... 700/131 |
| 6,564,118 B1 | * | 5/2003 | Swab ............................ 700/131 |
| 6,631,985 B2 | * | 10/2003 | Koizumi et al. .............. 347/101 |
| 6,646,757 B1 | * | 11/2003 | Silverbrook .................. 358/1.15 |
| 2002/0072289 A1 | * | 6/2002 | Jasani et al. ..................... 442/59 |

FOREIGN PATENT DOCUMENTS

| | | |
|---|---|---|
| EP | 0 732 674 A3 | 1/1998 |
| EP | 1 074 192 | 2/2001 |
| JP | 03090607 | 4/1991 |
| JP | 11001814 | 1/1999 |
| JP | 2000187683 | 7/2000 |
| JP | 2002024319 | 1/2002 |
| JP | 2002127556 | 5/2002 |
| JP | 2002133201 | 5/2002 |
| KR | 1020010103485 | 11/2001 |
| WO | 00/60513 | 10/2000 |
| WO | 01/26006 A2 | 4/2001 |
| WO | 01/27818 A1 | 4/2001 |
| WO | 01/53976 A2 | 7/2001 |
| WO | 01/84447 | 11/2001 |
| WO | 02/35952 A3 | 5/2002 |
| WO | 03/099052 | 12/2003 |

OTHER PUBLICATIONS

"International Search Report," mailed on Nov. 6, 2003 for PCT Application No. PCT/EP2003/005426.

* cited by examiner

FIG.3

Design-Related Data

| A P I | A P II | A P III |
|---|---|---|
| ( Basic Design ) | ( Sleeve ) | ( Colour A ) |
| Target I 1 | Target II 1 | Target III 1 |
| Target I 2 | [Target II 2] | Target III 2 |
| Target I 3 | Target II 3 | [Target III 3] |
| [Target I 4] | Target II 4 | Target III 4 |
| ⋮ | ⋮ | ⋮ |

Specimen-Related Data

Player Number    Player Name    Number    Size

FIG. 5

METHOD FOR THE PRODUCTION OF PRINTED ITEMS OF CLOTHING MADE FROM TEXTILE MATERIAL

CROSS-REFERENCE TO RELATED APPLICATIONS

The present application claims the benefit of the filing date of International Patent Application No. PCT/EP2003/005426, filed May 23 2003, which claims the benefit of German Patent Application No. 102 23 375.6, filed May 25, 2002, and entitled METHOD FOR THE PRODUCTION OF PRINTED ITEMS OF CLOTHING MADE FROM TEXTILE MATERIAL, which are incorporated herein by reference.

BACKGROUND OF THE INVENTION

The factory production of printed articles of clothing so far has made use of silk screen printing or offset printing processes. The classical silk screen printing process for smaller series is handcraft, with negative effects on speed, error frequency, starting expenses per order. In case of larger series, it is possible to make use of a silk screen printing line which, however, necessitates very high investment expenses. Offset printing may be used only if the length of the motif, as measured in the longitudinal direction of the fabric web, is not too large.

BRIEF DESCRIPTION OF THE DRAWINGS

FIGS. 2 and 3 show screen shots illustrating the appearance of a screen for setting selection targets according to one embodiment of the invention.

FIG. 5 shows part of a data set according to one embodiment of the invention.

DETAILED DESCRIPTION

Figure 1:
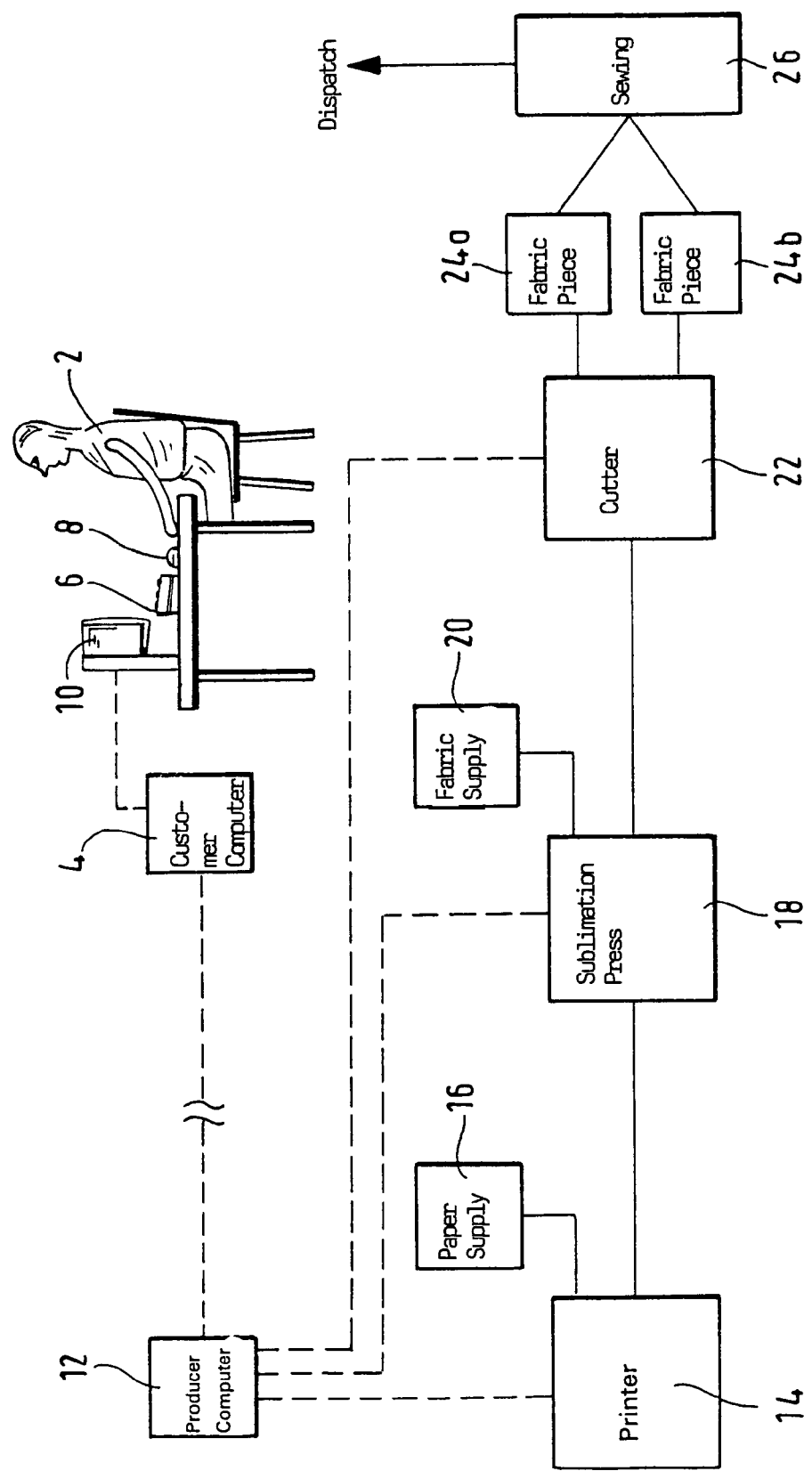
FIG. 1 is a block diagram illustrating a system according to an embodiment of the invention.

A first embodiment of the invention consists in a method of making a printed article of clothing of fabric, characterized by the following steps:

(a) a computer of a customer is connected for data exchange with a computer of a producer;
(b) the customer determines, i.e. sets the design of a desired article of clothing via the customer computer/producer computer connection by setting for a plurality of design parameters (e.g. basic design, colour, size) a respective selection target from several selection targets possible;
(c) based on data from said design setting, several print parts are printed on a printing medium by means of a printer, said printing medium being either directly a fabric panel or an intermediate medium the print of which is transferred to fabric later on;
(d) fabric pieces (e.g. chest piece, back piece, sleeve piece) are cut out from a fabric panel, in which
the fabric panel either originates from direct printing,
or the fabric panel originates from the print transfer from the intermediate medium,
or the fabric panel is unprinted and the cut fabric pieces are subjected to the print transfer later on;
(e) and several fabric pieces are sewn together to form the article of clothing.

By way of the method according to this embodiment of the invention, a producer is capable of offering its customer a particularly convenient choice of the design of an article of clothing from among a plurality of possibilities and, due to the reduced utilization of human activity, is able to produce in extremely efficient manner, even the smallest order quantities. At the lower limit, the particular customer may select one single article of clothing in a very individual design, and this article of clothing, because of the extremely efficient production thereof, can be manufactured at an acceptable price in profitable manner. Larger order quantities in an identical or partly identical article of clothing design, of course, are possible without any problem. The optimized and shortened processes during selection and production process lead to a very short processing time; between order and dispatch e.g. by mail there are as a rule just a few days.

In this embodiment of the invention, the printer is controlled on the basis of data from the design setting. This constitutes a novel combination of the process of selecting the design of the article of clothing and of the main process of making the article of clothing.

This embodiment is particularly preferred for making printed sportswear of fabric, i.e. in particular articles of clothing worn in the course of sports activities or in the course of sports-related activities (e.g. training suit for warming up prior to high jump). Examples of articles of clothing that are not sportswear are: ties, ladies blouses, ladies dresses.

The connection for data exchange between the customer computer and the producer computer preferably is an online connection via the Internet. The term "producer computer" also comprises one or more sub-computers that may be physically separated from the producer computer proper permitting the selection, but are connected to the same for data exchange.

The further description will illustrate in still clearer manner that the term "selection target" has to be understood in one or more of the embodiments of the invention. It may be a concrete series of selection targets (at the particular design parameter), e.g. a hundred colours among which the customer may choose. However, in case of other design parameters, the term "selection target" may also mean that the customer does not make a setting by selection from a concrete plurality of selection targets, but by making an input to the computer in a different manner. A typical example in this respect are the numbers of the players of a team to be printed on sports shirts. Instead of having player numbers e.g. from 1 to 30 stored in the computer, from which the customer makes a concrete choice, it may also be provided that the customer writes the desired player number or numbers into an entry mask. This kind of "selection target setting" becomes still more apparent when it is desired to print The name of a sports club, e.g. AC MILANO. Writing by the customer into an entry mask is the most practicable procedure in such cases. With those selection targets among which the customer makes a choice from concretely given possibilities, it is as a rule most expedient to store in the producer computer (or another memory location connected to the producer computer for data exchange) those selection targets among which the customer may make a choice.

Preferably employed printers generate the print image from a large number of closely arranged print image dots. A type of printers commonly employed at present and preferred for the some of the embodiments of the invention is the printer type operating according to the ink jet principle. Especially in case of ink jet printers, "controlling of the printer for printing print parts" finally means that a command has to be given for every print dot printed by the printer, irrespective of whether or not ink is to be printed on this dot; in addition thereto, a command has to be given possibly as to the particular colour to be used for printing a dot there. However, embodiments of the invention may make use of any type of printer capable of being controlled with respect to the print images to be generated on the basis of data from the selection target setting.

The printing medium on which the printer operates may be directly a fabric panel.

However, in many cases it is more expedient to print the print parts firstly on an intermediate medium, in particular impregnated paper. Thereafter, the print may be transferred to fabric preferably by sublimation (face-to-face arrangement, application of increased temperature and pressure; in practical application e.g. by way of an internally heated, rotatable roller or a heated plate-like press). As a rule, the print is transferred to polyester material as the printing inks effect a perfect chemical reaction with polyester during sublimation.

As regards the cutting of the fabric pieces, it is possible on the one hand to cut them from the fabric panel that originates from direct printing. In case of a print transfer from the intermediate medium to the fabric, there are two possibilities: it is possible to cut out the fabric pieces from the fabric panel after the print transfer. As an alternative, it is also possible to cut out from a still unprinted fabric panel and to subject the cut fabric pieces only thereafter to the print transfer. The latter procedure is particularly expedient when a comparatively large number of fabric pieces of the same standard size is to be produced; in that event, it is possible to simultaneously cut a larger number of fabric pieces e.g. by means of a multi-ply cutter. The print transfer then is effected most expediently in a flat press, instead of a rotating press. The data for cutting may originate either from the design setting or from a separate source, e.g. from patterns for the required standard sizes.

Cutting of the fabric pieces may be performed manually. As an alternative, it is conceivable to make use of an automated single-ply cutter or an automated multi-ply cutter in case of a larger number of articles of clothing that are identical in at least part of the selection target settings. The automated cutters may be controlled preferably on the basis of data from the afore-described setting of the clothing design. An alternative possibility is an optical control on the basis of the outline of the print image on the fabric. The cutters may operate making use of a rotating blade or a laser beam.

Figure 7:
FIG. 7 shows the appearance of the fabric pieces of FIG. 6 including a cutting line and a working line.

As the cut fabric pieces then have to be sewn together to form the article of clothing, the fabric pieces have to be cut with a seam allowance in addition to the fabric piece visible in the finished article of clothing. On the one hand, there is the possibility to utilize the edge of the print for the respective fabric piece as a cutting line; in this case, the particular fabric piece has to be printed in a manner that is "too big" by the seam allowance. On the other hand, as shown in FIG. 7, there is the possibility to utilize as cutting line 701 spaced in parallel from the edge of the print image and to use the edge of the print 702 as "working line" when the fabric pieces are sewn together (in practical application, the seam is to be located slightly beside the edge of the print so that there will be no unprinted fabric parts visible in the finished article of clothing).

Sewing together of a plurality of fabric pieces to form the article of clothing may be carried out using a sewing machine, with the operator determining the position of the seam by feeding fabric pieces in corresponding manner. As an alternative, a partly automated or fully automated sewing machine may be employed which automatically feeds the fabric pieces to be sewn to each other to the sewing location.

The main elements (1) producer computer, (2) printer, (3) optionally print transfer station, (4) cutting station, (5) sewing station may be positioned in spatially close vicinity to each other. However, it is also possible to have spatial distances between individual ones or several ones of these main elements. For example, it is possible to connect the producer computer for data exchange to the printer or even to transmit the data to the printer on a data carrier. The transfer of the print medium from the printer to the sublimation press may be automated or be effected manually; there may even be a transport distance therebetween. The same holds for the transfer from the sublimation press to the cutting station. Furthermore, the same holds analogously for the transfer from the cutting station to the sewing station. Intermediate storage means may be provided between individual ones or all of the main elements, but this is no cogent necessity.

Another embodiment of the invention is an article of clothing made in accordance with the method described hereinbefore.

A second embodiment of the invention is a method of making printed fabric pieces for an article of clothing, characterized by the following steps:

(a) a computer of a customer is connected for data exchange with a computer of a producer;

(b) the customer sets the design of a desired article of clothing via the customer computer/producer computer connection by setting for a plurality of design parameters (e.g. basic design, colour, size) a respective selection target from several selection targets possible;

(c) based on data from said design setting, several print parts are printed on a printing medium by means of a printer, said printing medium being either directly a fabric panel or an intermediate medium the print of which is transferred to fabric later on;

(d) fabric pieces (e.g. chest piece, back piece, sleeve piece) are cut out from a fabric panel, in which
the fabric panel either originates from direct printing,
or the fabric panel originates from the print transfer from the intermediate medium,
or the fabric panel is unprinted and the cut fabric pieces are subjected to the print transfer later on.

This method differs from the method described hereinbefore in that it no longer contains the step of sewing together several fabric pieces to form the article of clothing. The gist of this embodiment of the invention can also be realized without the sewing step.

An additional embodiment of the invention consists in fabric pieces for an article of clothing that are manufactured in accordance with the method described immediately hereinbefore.

A third embodiment of the invention is a method of generating a data set for making a printed article of clothing of fabric, characterized by the following steps:

(a) a computer of a customer is connected for data exchange with a computer of a producer;

(b) the customer sets the design of a desired article of clothing via the customer computer/producer computer connection by setting for a plurality of design parameters (e.g. basic design, colour, size) a respective selection target from several selection targets possible;

(c) and in consideration of this design setting, a data set is compiled which is representative of the desired design of the article of clothing and is suited and intended to be utilized as basis for, with respect to the print images, electronically controlled printing of print parts on a printing medium which are used in making the article of clothing to be produced.

This method differs from the method described first hereinbefore in that the actual printing step, the cutting step and the sewing step are not included therein. This method goes as far as compiling a data set suited and intended to be utilized as basis for printing the print parts.

An additional embodiment of the invention is a data record or data set for making a printed article of clothing of fabric that is generated in accordance with the method described immediately hereinbefore.

A fourth embodiment of the invention is a method of making printed fabric pieces for an article of clothing, characterized by the following steps:
(a) on the basis of a data set which is representative of the desired design of the article of clothing, print parts are printed on a printing medium by means of a printer that is controlled electronically with respect to the print images;
(b) the printing medium being either directly a fabric panel or an intermediate medium the print of which is transferred to fabric later on;
(c) and fabric pieces (e.g. chest piece, back piece, sleeve piece) are cut out from a fabric panel, in which
 the fabric panel either originates from direct printing,
 or the fabric panel originates from the print transfer from the intermediate medium, or the fabric panel is unprinted and the cut fabric pieces are subjected to the print transfer later on.

This method differs from the method described first hereinbefore in that it commences with a data set that is representative of the desired design of the article of clothing and comprises the main steps of printing and cutting; the step of sewing the fabric pieces together to form the article of clothing is not necessarily part of this method.

An additional embodiment of the invention consists in fabric pieces for an article of clothing made in accordance with the method described immediately hereinbefore.

Preferably, the possible selection targets are graphically represented for the customer on a display means for at least one of the design parameters. The customer may then choose, e.g. by clicking, a selection target setting (with respect to this concrete design parameter). It has already been indicated hereinbefore that it may be more practical with some types of selection targets to perform the selection target setting in a different manner.

At least for part of the selection target settings, it is preferably graphically illustrated to the customer on a display means what the article of clothing looks like when the latter is designed with a specific selection target setting. This does not have to be a true representation of the article of clothing. A more or less schematic representation of the article of clothing is sufficient. What is important to the customer is mainly the optical impression in case of combinations of specific selection target settings for several design parameters. A typical example: with a basic design of "longitudinal stripes on the chest and stars on the back", what will the colour combination red/black for the longitudinal stripes and black ground with white stars on the back look like?

Preferably, there is provided a function permitting the customer to make first a preliminary selection target setting, to have a look at the result of this preliminary selection target setting on the display means and to then either make this selection target setting final or revert to an alternative selection target setting.

The design parameters among which a selection may be made preferably include at least one of the following group:
basic design (e.g. longitudinal stripes, transverse stripes on chest, arcuate boundary of colour areas);
arm length/leg length/overall length;
cut (e.g. slim-fit, male, female);
shape of neck opening (e.g. larger opening, smaller opening, V-neck, round neck);
type of collar (e.g. turn-down collar or just different kind of fabric than in the adjoining fabric section);
wristband yes/no;
colour;
several different colours (e.g. for the stripes, for chest/back, for the script objects);
script object (e.g. name of club, name of player, number of player);
placement of script object;
typeface of script object;
logo (e.g. club logo, sponsor logo);
placement of logo;
size of article of clothing (e.g. S for small, M for medium, L for large, XL);
fabric quality.

The design parameters preferably include at least the following ones:
basic design;
several different colours;
size of the article of clothing.

Preferably, the customer is given the possibility of taking influence on the printing size as regards the script objects and the logo. Especially as regards the logo, the customer is preferably given the possibility to electronically transfer the desired logo (which the customer itself has downloaded to its customer computer e.g. via the Internet) to the producer computer via the customer computer/producer computer connection.

The methods according to the some of the embodiments invention are suited to have produced, for one specific customer X, a single concrete article of clothing with the selection target settings made by this customer (analogously other customers Y, Z, . . . ).Naturally, the customer x (e.g. a wholesaler) may also order 50 identical articles of clothing. A particularly interesting possibility is, however, the situation that the customer X (e.g. a sports club) orders e.g. 100 articles of clothing having an identical selection target setting for part of the design parameters (e.g. basic design, shape of neckline, collar variant, colours), but having at least partially different selection target settings (e.g. 10 articles of clothing in size S withplayer numbers, 2, 5, 6, 8, 12, 13, 15, 16, 19, 22) for another part of the design parameters.

It is preferred with regard to such situations that, for part of the design parameters, the selection target setting is made the same for a multiple number of articles of clothing and that, for another part of the design parameters, the selection target setting is not made the same for the multiple number of articles of clothing.

The methods according to the some of the embodiments of the invention are excellently suited to perform not only the described setting of the article of clothing design via the customer computer/producer computer connection, but also the ordering proper by the customer at the producer's and/or the payment agreements concerning the article or articles of clothing. The payment agreements may include terms e.g. for payment by the customer by cash on delivery or by a cheque/transfer in the amount indicated or by the customer giving a direct debit authorization or by agreeing on payment by credit card with a specific number or by payment by way of a different payment mode of electronic trading.

Preferably, the entire selection target setting is transmitted to the customer so that the latter may place his order in confirmation of this selection target setting. The transmission may be effected by e-mail or telefax or by ordinary mail. At least part of the selection target settings may be made by characterization in words (e.g. female, large round neckline, . . . ). Preferably, a more or less schematic graphical representation of the article of clothing to be ordered is transmitted as well. This graphical representation does not have to contain all selection target settings, but should contain the particularly conspicuous selection target settings, such as e.g. colour settings.

A fifth embodiment of the invention is a production means for making printed fabric pieces for an article of clothing, characterized by:

(a) a printer that is controlled electronically with respect to the print images, for printing print parts on a printing medium,
(b) the printing medium being either directly a fabric panel or an intermediate medium the print of which is transferred to fabric later on;
(c) and a producer computer adapted to be connected to a customer computer so as to permit a customer to set the design of a desired article of clothing,
(d) the producer computer being capable of generating, in consideration of the customer's design setting, a file as basis for controlling the printer.

As can be seen immediately, this production means serves to carry out production steps as described hereinbefore in connection with methods according to this embodiment of the invention. It is emphasized that all preferred features of the inventive methods described in the present application—as regards the physical character thereof—are also preferred features of the production means according to many embodiments of the invention.

A sixth embodiment of the invention is a data processing program adapted to be utilized in making a printed article of clothing of fabric, characterized in (a) that there is provided a first program part permitting a program user, by means of a display means and an input means, to set a respective selection target by command for a plurality of design parameters (e.g. basic design, size, colour) of an article of clothing to be made, said first program part having the function of compiling a data set representative of the desired design of the article of clothing in consideration of the setting commands;
(b) and that there is provided a second program part having the function of generating a graphics file making use of the data set, said graphics file being adapted to be utilized as basis for printing print parts on a printing medium which are used in making the article of clothing to be produced.

It can be seen that it is possible by means of this data processing program to perform the methods according to the embodiment of the invention described hereinbefore. The term "adapted to be utilized as basis for printing print parts on a printing medium which . . . " was chosen to cover the two possibilities described further above, namely printing on an intermediate medium and subsequent transfer to fabric or printing directly on fabric.

The first program part preferably has the function of allowing for at least one design parameter the setting of a selection target with the aid of a graphical representation of several possible selection targets on the display means.

The first program part preferably has the function of graphically representing an article of clothing on the display means and, at least for part of the design parameters, of altering the graphical representation in accordance with the setting commands. The article of clothing, as already mentioned hereinbefore, may be represented in more or less schematic manner. It is not absolutely necessary to show the entire article of clothing, but it may be sufficient to show only part of the article of clothing.

The first program part preferably has the function that the program user may alter a selection target setting made. This is particularly user-friendly when a preliminary selection target setting made first is realized in the graphical representation of the article of clothing and when the program user then has the alternative possibilities of confirmation or making a new target selection setting for the same design parameter.

The data processing program, as regards the design parameters for which a selection may be made, preferably comprises at least one parameter of the group listed hereinbefore in connection with the method, and in particularly preferred manner the group of three design parameters indicated hereinbefore in connection with the method.

The first program part for making a related number of articles of clothing preferably comprises the following functions:

there is at least one design parameter of a first kind which has the same selection target setting for the full number of articles of clothing, which is referred to as number parameter;

there is at least one design parameter of a second kind which has a selection target setting permitting a dissimilar setting for the number of articles of clothing, which is referred to as specimen parameter;

the selection target setting for the at least one number parameter and the respective selection target setting for the at least one specimen parameter are made one after the other;

and by combining the at least one number parameter selection target setting and at least one specimen parameter selection target setting, the respective data set is compiled for each article of clothing of the number of articles of clothing.

This preferred design renders the production of a number of articles of clothing uncomplicated in which part of the design parameters is the same for the entire number, whereas this does not hold for another part of the design parameters, as explained hereinbefore by way of a more detailed example. It is emphasized that the number parameter or parameters can be established first by selection target setting, whereupon the specimen parameter or parameters may be established by selection target setting; however, this sequence may also be reversed.

Preferably, the second program part cooperates with a data memory storing a respective plurality of initial graphics files for the print parts of the article of clothing to be produced, namely initial graphics files for all selection targets at least with respect to one design parameter; and the second program part has the function of picking out an initial graphics file in accordance with the data set and to modify the same with respect to the selection target setting of other design parameters.

It is particularly expedient to have especially the basic designs stored in the data memory from the very beginning. However, it is also possible to have already combinations of several design parameters in the data memory, preferably all basic designs in each size. The selected term "modify" means in most cases that the file chosen from the data memory is supplemented in accordance with the data set, e.g. by a specific collar, a specific club name or a selection target setting with respect to the fabric quality. In many cases, this will mean at the same time an alteration of the file since e.g. the area for printing a club name in a contrasting colour formerly showed image dots in the basic colour of the basic design.

The second program part preferably has the function of taking account of the aspect of a space-saving arrangement of the print parts on the printing medium. For example, it is possible to place e.g. beside chest pieces, narrow fabric pieces for collars. It may be practical to rotate some print parts e.g. by 90° for printing in order to thus exploit the printing medium as efficiently as possible.

The graphics file generated by the second program part preferably is given to a printer driver, preferably a raster image processing printer driver, which controls a printer for printing print parts. The second program part preferably makes use of vectorial data. The printer driver processes the output data of the second program part such that the printer (usually controlled in X/Y coordinate fashion) may be controlled in optimum manner by means of the processed data. In addition thereto, it is possible to obtain by means of RIP a more perfect colour matching in printing. The printer driver may have a spool function permitting the data to be processed sequentially. There may also be a mirroring function there, which is expedient for printing on intermediate medium.

A seventh embodiment of the invention is a computer system having installed therein a data processing program which may be utilized in making a printed article of clothing of fabric, said data processing program being characterized in (a) that there is provided a first program part permitting a program user, by means of a display means and an input means, to set a respective selection target by command for a plurality of design parameters (e.g. basic design, size, colour) of an article of clothing to be made, said first program part having the function of compiling a data set representative of the desired design of the article of clothing in consideration of the setting commands;

(b) and that there is provided a second program part having the function of generating a graphics file making use of the data set, said graphics file being adapted to be utilized as basis for printing print parts on a printing medium which are used in making the article of clothing to be produced.

It can be seen that this computer system has the particular data processing program installed therein that was described hereinbefore. All preferred features described in conjunction with the data processing program according to the some embodiments of the invention preferably can be provided in the computer system according to this embodiment of the invention as well.

It is pointed out that all statements made hereinbefore in connection with the data processing program are applicable and may also be used with respect to the method according to this embodiment of the invention and with respect to the production means according to many embodiments of the invention. The same holds inversely for statements made hereinbefore in connection with the method according to many embodiments the invention.

It is possible and preferred in the method according to the some embodiments of the invention and the data processing program according to some embodiments of the invention as well as the computer system according to some embodiments of the invention to make available on the one hand a considerable number of design parameters for the selection activity of the customer or program user and—which is particularly important—to offer on the other hand a very large number of selection targets each for some of the selection parameters. For example, it is preferred to offer at least 50 basic designs and/or at least 40 colours and/or at least four sizes and/or at least five typefaces for script objects.

An additional embodiment of the invention is a computer program product having the afore-described features of the data processing program according to the some embodiments of the invention. Preferred features of the data processing program are also preferred features of the computer program product. A preferred embodiment of the computer program product is a machine-readable data carrier having the data processing program according to this embodiment of the invention stored thereon.

The "method of . . . ", "production means for . . . ", "data processing program for . . . ", "computer system for . . . " hereinbefore always made reference in singular form to producing an article of clothing. Of course, this language is to comprise also the case in which a plurality of articles of clothing is made in close relationship in terms of time. The "fabric pieces for an article of clothing" are referred to in plural form as there are usually several fabric pieces necessary for a complete article of clothing. However, it is emphasized that some embodiments of the invention are also methods, a production means, a data processing program and a computer system in which the production aim is only one single printed fabric piece for an article of clothing (or several printed fabric pieces, and only one thereof for each respective article of clothing). For example, it is possible to make e.g. a necktie from one single printed fabric piece that is sewn to itself along a seam. Another example is a neck scarf. In addition thereto, the scope of many embodiments of the invention also comprises articles of clothing in which the fabric pieces in part are printed, but in part have also been made in a different manner. An example is a bathing suit having a front piece printed and a back piece of conventional single-colour fabric.

It has been pointed out hereinbefore that the method described in the first instance is a method according to an embodiment the invention also without the sewing step (e). It is to be pointed out here that, in addition thereto, the cutting step (d) may be omitted as well and that the thus resulting method with steps (a), (b), (c) is an alternative method according to some embodiments of the invention.

A customer 2 has a customer computer 4, e.g. a PC, and operates the same by means of a keyboard 6 and mouse 8, respectively, and a screen 10. The customer computer 4 is online connected, via the Internet, to a producer computer 12, e.g. a network server of a producer company. The producer computer 12 has stored in the memory thereof a plurality of respective selection targets as possibilities to be selected for a plurality of design parameters (numerous examples of design parameters were already given hereinbefore). For example, in the manner of a menu and/or by way of link fields, the customer 2 may proceed from design parameter to design parameter and may have the selection targets available for each design parameter indicated to him either in the form of words or as an optical representation. In part of the design parameters (e.g. script object, size), the selection target is determined or set by making an entry (e.g. of letters, numbers). By click-operation or entering, the respective selection is then made, and at the end the setting for the entire design of the article of clothing is established. Thereafter, the ordering process proper and the payment agreements may be made, also online.

The producer computer 12 thus has available all data for handling the production of one or several articles of clothing ordered (optionally also the data for the dispatch address and the payment).

In the following, the production will be described first for the case in which the order comprises only one single article of clothing, e.g. bathing shorts:

A printer 14 is controlled on the basis of data from the producer computer 12 such that it prints, on one and the same paper section—a bathing shorts front piece and a bathing shorts back piece, e.g. in sex male, size XL, legs medium length, bathing shorts back piece basic colour blue with a white large star, bathing shorts front piece longitudinal stripes blue/red, without number, without name, without advertising. A paper section from a paper supply 16 (in the form of a roll or a stack) is fed each time to the printer 14 either automatically or manually.

The printed paper section is transferred automatically or manually to a sublimation press 18 which, in addition to the particular paper section, is fed with a fabric section from a fabric supply 20 (roll or stack) before the sublimation operation is carried out. For performing the sublimation operation, the fabric section has to lie on the paper section face to face, which may be effected manually or automatically. The sublimation press 18 performs the sublimation operation with the application of pressure and heat. The sublimation press 18 may operate using a heated rotating roller against which an endless, revolving felt web is pressed; in the gap between the roller and the felt web, the paper section and the fabric section are conveyed lying face to face on each other. As an alternative, it is possible to make use of a press working in stationary manner, with the paper section and the fabric section being inserted therein. The heated press is then closed. Sublimation means ink transfer from the paper section to the fabric section.

Either in automated fashion or by hand, the fabric section is then fed to a cutter 22. On the basis of data from the producer computer 12, the cutter 22 cuts out the bathing shorts front piece and the bathing shorts back piece from the fabric section either simultaneously or one after the other, so that there are formed two fabric pieces 24*a* and 24*b*. For sewing the fabric pieces 24*a* and 24*b* together at a station 26, the fabric pieces 24*a* and 24*b* are either packed together and dispatched to a locally remote station 26, or they are sewn to each other in the immediate vicinity of the facilities 14, 16, 18, 20, 22.

When one and the same article of clothing in identical design is to be produced in a larger number, e.g. 30 pieces for a sports club or 100 pieces for a group of sportswear shops or 1000 pieces for a chain of department stores, the production process proceeds analogously as described hereinbefore for a single article of clothing. However, it may be advantageous to provide for intermediate storage of the control data for the printer 14 and/or the cutter 22 at the respective apparatus.

It can also be seen from the description given hereinbefore that it is possible without any problem in the method according to some embodiments of the invention to produce a larger number of articles of clothing, in which a respective selection target varies from article of clothing to article of clothing (e.g. one soccer shirt with player number 1, one soccer shirt with player number 2 etc.), and it is possible to produce a respective group of alike articles of clothing and to make a change thereafter (e.g. 10 basketball shorts in size M, 20 basketball shorts in size L, 20 basketball shorts in size XL, etc.). All of this is controlled by the producer computer 12 directly or indirectly in automatic fashion.

It can be seen from the description given hereinbefore that the customer 2 is in the position to make a choice in extremely convenient manner from an extremely large number of possibilities (without the producer having to physically produce e.g. sample series) and that the producer company is capable of making do with a minimum of human resources while still being able to produce efficiently also in case of the lowermost limit of an individual order quantity, namely one single article of clothing.

Figure 2:
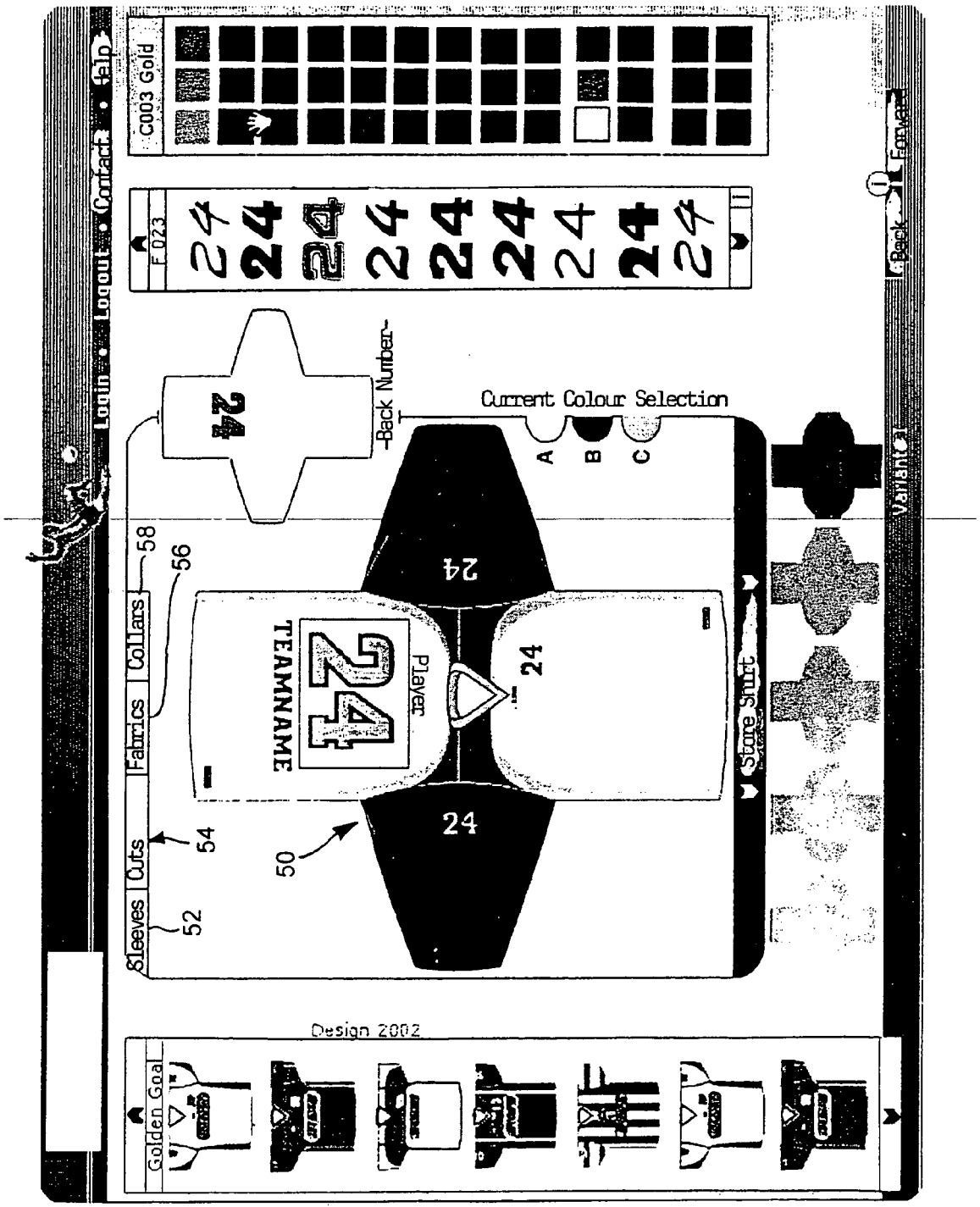
Figure 3:
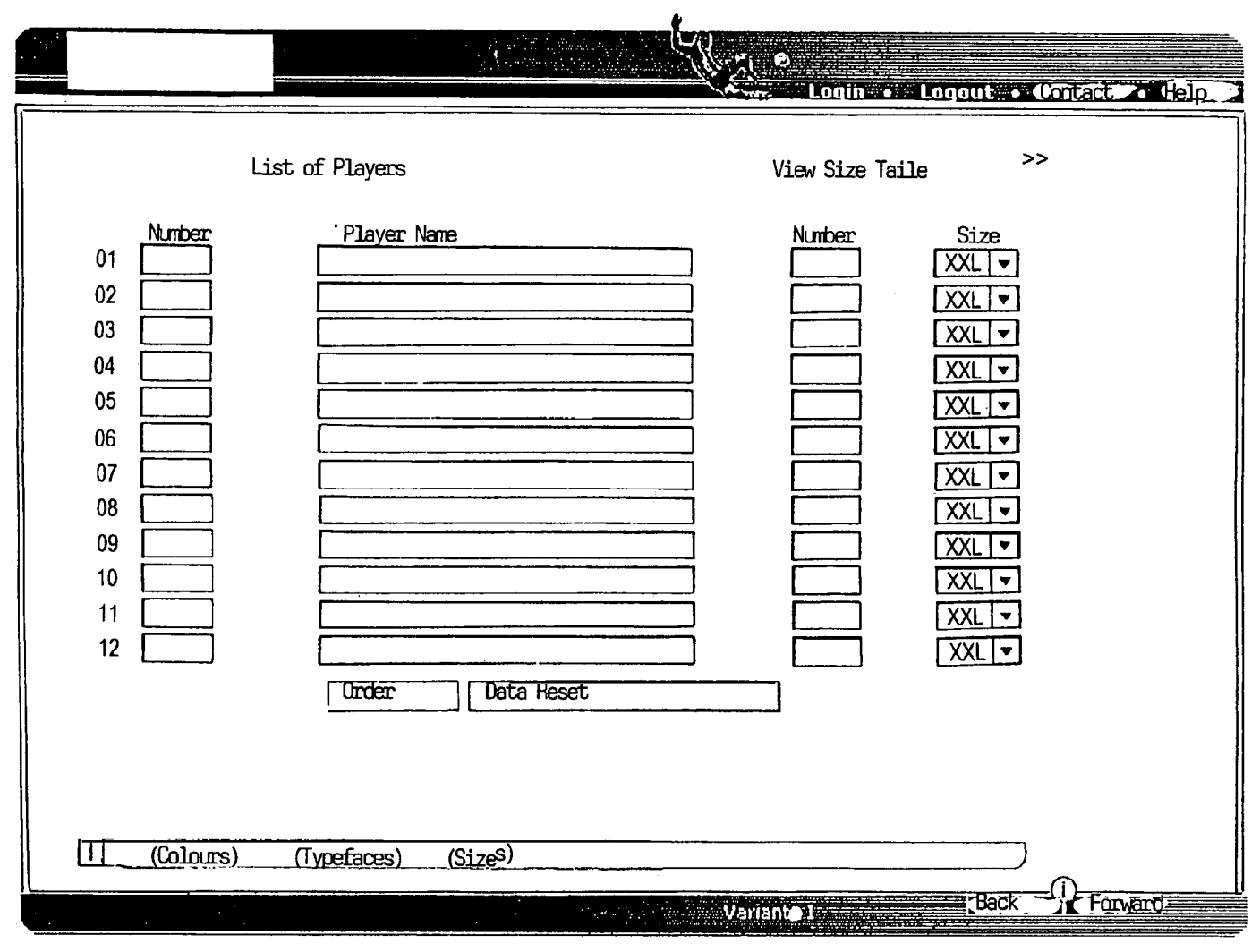

It is to be demonstrated by way of FIGS. 2 and 3 in what manner the selection target setting presents itself to the customer 2 on his screen 10.

FIG. 2 shows the state after the customer 2 has set a specific basic design 50 on the left-hand menu bar. The basic design 50 set is schematically illustrated on the screen 10, namely front piece (further to the bottom on the screen) and back piece (further to the top on the screen) folded into the screen plane and at the same time held together along the subsequent shoulder seam. The sleeve pieces are also folded into the screen plane and at the same time joined to the front piece and to the back piece along the sleeve seams.

When the customer 2 moves the mouse 8 to place the cursor onto a field 52 "sleeve", there will appear a menu bar on which the customer 2 may make a setting from among several sleeve lengths by way of a mouse click. When the customer 2 moves the mouse 8 to place the cursor on a field 54 "cuts", a menu bar for several cuts will open, e.g. male or female. When the customer 2 moves the mouse 8 to place the cursor on a field 56 "fabrics", there will open a menu bar with several kinds of fabrics expressed in words among which he may make a selection target setting. When the customer 2 moves the mouse 8 to place the cursor on a field 58 "collars", there will open a menu bar permitting the customer 2 to choose from among a plurality of collar types—indicated as words or as graphical representations—, such as e.g. sports shirt collar or plain collar in the form of a narrow fabric strip.

FIG. 2 illustrates the state in which the customer 2 has selected the design parameter "typefaces". In the menu bar shown to the right of the set basic design 50 illustrated, the customer 2 may make a selection target setting from among a large number of typefaces, e.g. more in straight print, more in written form, with or without frame. The number "24" illustrated in FIG. 2 is a place-holder which later on is replaced by the actually desired player number.

To the very right in FIG. 2, one can see a menu bar for colours. The customer 2 first moves the cursor onto one of the colour fields A, B, C (A standing for the main colour in chest piece and back piece, B standing for the colour of the sleeves and the shoulder portions, C standing for the colour-contrasting edge strip on chest piece and back piece and the collar) and then sets the respective target colour for the areas A, B, C on the menu bar. The graphical representation 50 will then change its colours to the three colours set.

The menu bars shown for basic design, typeface, colours are scroll down bars, which thus are considerably longer than shown in FIG. 2 and may be scrolled down.

A selection target setting made with respect to the design parameters described so far may be stored and is then indicated in the horizontal bar underneath the basic design representation 50. It may remain stored so as to be available for subsequent orders by the customer 2.

FIG. 3 illustrates the appearance of the screen 10 in the next stage of the selection target setting, namely inputting of the so-called specimen data. The customer 2 may enter the player number to be printed, the player name to be printed, the number of shirts therefor and the shirt size therefor. As regards player number, player name and shirt number, this input is made by way of the keyboard 6, whereas with respect to the size the customer 2 may scroll through the possible sizes by mouse click.

Figure 4:
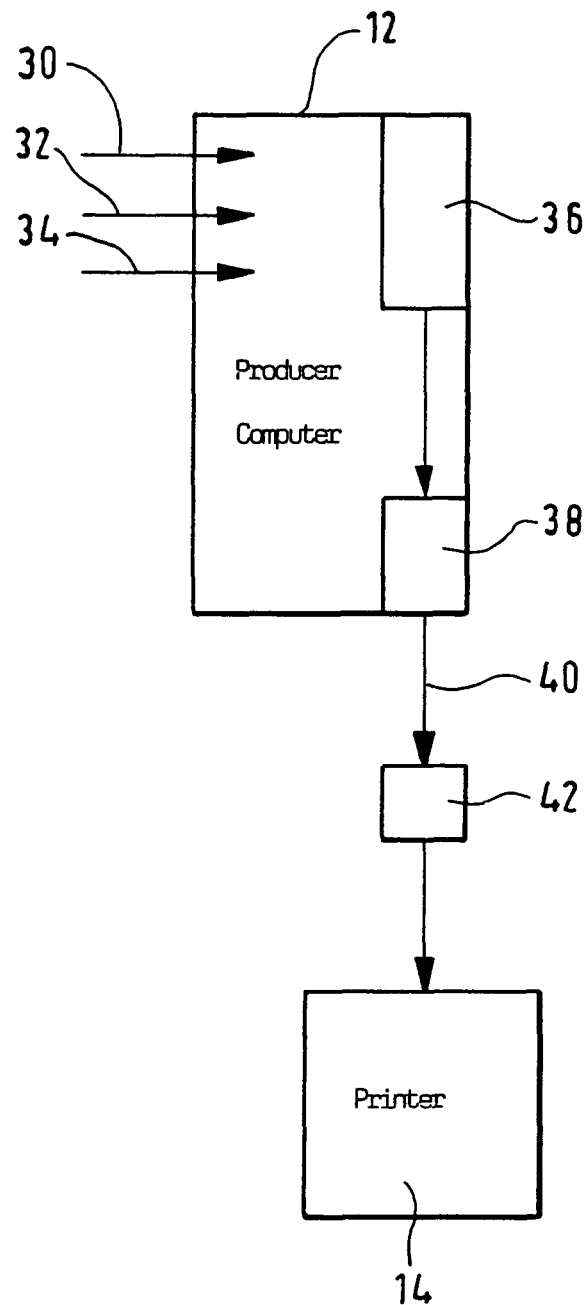
FIG. 4 shows a mode of operation of a data processing program according to one embodiment of the invention.

By way of FIGS. 4 and 5, a data processing program according to the one embodiment of invention is to be illustrated in more detail in exemplary fashion.

FIG. 4 illustrates a producer computer 12. Arrows 30, 32, 34 represent selection target commands of a program user, which are preferably input via the described connection customer computer 4/producer computer 12. Among the same, arrow 30 symbolically indicates selection target commands given on the basis of a graphical representation of several selection targets possible, e.g. by click-operation. Arrow 32 symbolically indicates selection target commands given by making a written entry in an entry mask. Arrow 34 symbolically indicates selection target commands that are not identical for all articles of clothing of a number of articles of clothing.

The entirety of the selection target commands 30, 32, 34 serves to establish a data set which may also be understood as an order file of a specific customer. FIG. 5 illustrates the contents of the data set 36. The abbreviation AP stands for design parameter. The data set in the upper portion contains the design-related data, with the selection targets set, namely I4, II2, III3, being shown in frames. The data set in the lower portion contains the specimen-related data. The design-related partial data set is added to each specimen-related partial data set. When there is a number of n pieces of articles of clothing to be made, the entire process is carried out n times.

The producer computer 12 generates one or more graphics files 38 in consideration of the data of the data set 36. The graphics files 38 constitute the optical representation of a print part to be printed, and these files 38 are printed by printer 14.

A second program part accesses a data memory. The latter stores the graphics information of the selective print parts to be printed, for all basic designs (e.g. transverse stripes) and variations (e.g. long sleeves and short sleeves).

In this regard, a print part (e.g. front piece) consists of one or more partial areas (e.g. stripes on the front piece).

For each size (e.g. XL) selected, the second program part retrieves from the data memory those print parts that correspond to the selection target n-tuple of the data set 36 (e.g. front piece, back piece, sports shirt collar, long sleeves in the design selected).

In the next steps, the print parts will be matched in accordance with the data from the data set 36.

In the data memory, all partial areas variable in colour are associated with colour groups. The individual partial areas are shown in accordance with their colour group in the colours selected by way of data set 36 (e.g. it was pointed out in data set 36 that the main colour is to be white and the colour of the transverse stripe red).

Moreover, the additional design elements (e.g. logos) specified in data set 36 are inserted in the print parts (if required). In doing so, the logos are both placed at the corresponding location in the print part and transformed. Transforming means that the respective logo is scaled to the desired dimensions and that there are possibly performed rotations and distortions.

Analogously therewith, the script objects (e.g. club name, player name) are inserted in the corresponding print parts. In doing so, position and transformation are taken over again. In addition thereto, the script objects are matched in terms of typography (i.e. typeface, formatting etc.) and colouring with regard to the selection target settings contained in data set 36.

The script contents are matched in accordance with data set 36 as well. For example, all shirts are given the team name "AC Milano", but each shirt is given a different number and a different player name. If necessary, the second program part matches the dimensions and the typography of the script object to the script contents. For example, the name "J.R." has a different width than the name "Ehrenmann", and possibly there will also be utilized a larger typeface for the name "J.R.".

In addition thereto the second program part arranges the print parts as ideally as possible with respect to restrictions of the target media (width and length of fabric and possibly paper) and with respect to the further operational process.

Finally, the second program part stores the finished print parts in a format that can be interpreted by the printer driver.

For the actual production of the article of clothing, the data 40 are supplied from the producer computer 12 from one graphics file 38, mostly however from several graphics files 38, to a printer driver 42. The printer driver 42 controls the printer 14 such that all paper print parts of the order under consideration are printed sequentially in terms of time in accordance with the fabric pieces to be produced.

Figure 6:
FIG. 6 shows the appearance of the fabric pieces for two sports shirts after sublimation on a fabric web.

FIG. 6 illustrates what the fabric pieces 24 look like after the sublimation step on a fabric web. A fabric web e.g. of a width of 1.5 m has, in a space-saving arrangement, a front piece at the upper left, a back piece at the upper right, a first sleeve at the lower left and a second sleeve at the lower right. The fabric pieces are sublimated, where possible, in closely adjoining manner along a common border line. At the very bottom in FIG. 6, one can see the two collar pieces for the two shirts sublimated in closely adjoining manner along a common border line. The words "GROSS" and "KLEIN" are representative of two player names; the word "MILANO" is representative of a team name.

FIG. 6 illustrates furthermore the appearance of the overall graphics file for a production order. FIG. 6 just reflects the printing result on the paper as printed by printer 14 on the basis of graphics file 36 (in a right/left mirror image with respect to FIG. 6), from which the fabric pieces 24 were then formed by sublimation.

In practical application, the printer 14 is started best after the producer computer 12 has received a larger number of orders, e.g. after the lunch break of each working day. All orders present will then be settled by printing, sublimating, optionally cutting, optionally sewing. It is, for example, possible to print on an entire paper roll (across a width of 1 m, 130 m length) to a more or lesser extent.

In some embodiments of the invention it is easily possible to print an order number assigned by the producer computer 12 for each order, optionally along with a date, at an inconspicuous small location of the shirt, and in addition thereto e.g. an identical number on all print parts for the particular article of clothing. In this manner, the related print parts of each article of clothing may easily be found again and brought together after the cutting operation.

The invention claimed is:

1. A method of making a set of printed fabric pieces with fabric piece dimensions confined by respective cutting lines for use in an article of clothing, wherein the printed fabric pieces each are provided with a print having a print-size corresponding, or nearly corresponding to one of (i) the dimensions of the respective printed fabric piece, and (ii) the dimensions of the respective printed fabric piece minus seam allowance, wherein at least sonic of said printed fabric pieces having said print sizes each are provided with a multi color print composed of a plurality of color areas, and wherein the set of printed fabric pieces comprises at least two fabric pieces provided with different multi color prints having different arrangements of color areas, the method comprising:

transmitting data, by a producer computer, wherein said data enable a customer to determine a design of the article of clothing by setting a plurality of design parameters;

wherein the data transmitted by the producer computer includes data to enable the customer to visualize a plurality of possible basic designs for the article of clothing, the basic designs having different configurations for the boundaries of the color areas within said multi color prints;

wherein the data transmitted by the producer computer further enables the customer to set a basic design by selecting from the plurality of possible basic designs;

wherein the data transmitted by the producer computer further enables the customer to set colors for said prints, including colors for the color areas of said multi color prints by selecting from a plurality of possible colors; and wherein the data transmitted by the producer computer further enables the customer to set a size of the article of clothing;

receiving by the producer computer data representing the plurality of design parameters selected by the customer, including data representing the selected basic design, data representing the selected colors associated with said prints including colors associated with the color areas of said multi color prints, and data representing the size selected by the customer;

in the producer computer, compiling the received data representing the plurality of design parameters selected by the customer, to establish a set of data representative of the design of the article of clothing;

based on the set of data representative of the design of the article of clothing, printing a set of prints for the set of printed fabric pieces on a printing medium, the printing being effected with the selected colors, including the selected colors for the color areas of said multi color prints, the priming being further effected to produce the print sizes corresponding, or nearly corresponding to one of (i) the dimensions of the respective printed fabric piece, and (ii) the dimensions of the respective printed fabric piece minus seam allowance, and the printing being further effected to produce the at least two different multi color prints having different arrangements of color areas, wherein the printing medium is one of (i) fabric, or (ii) an intermediate medium, from which the prints are then transferred to fabric;

cutting out fabric pieces for the set of printed fabric pieces either before or after the fabric pieces have been provided with the prints.

2. The method according to claim 1, further comprising sewing at least some of the printed fabric pieces together to form the article of clothing.

3. The method according to claim 1, wherein the printing medium comprises the fabric pieces to be sewn together to form the article of clothing.

4. The method according to claim 1, further comprising transmitting data to further enable the customer to visualize the plurality of possible colors, and/or to visualize, for at least one further design parameter, a plurality of setting options on a display.

5. The method according to claim 1 further comprising transmitting data to further enable, for the colors and/or at least one further design parameter, a graphical representation to the customer on a display, the graphical representation corresponding to what the article of clothing looks like with the respective selection for the colors and/or at least one further design parameter.

6. The method according to claim 1, wherein the design parameters further comprise at least one of:
dimensions;
cut;
shape of neck opening;
type of collar:;
wristband;
script object;
placement of script object;
typeface of script object;
logo;
placement of logo; or
type of fabric.

7. The method according to claim 1, wherein the set of printed fabric pieces includes a plurality of sets of printed fabric pieces, each set for use in a respective one article of clothing, the method further comprising:
transmitting data, by the producer computer, to enable the customer to make, concerning at least one design parameter, a selection that is the same for all sets of printed fabric pieces, and to make, concerning at least one further design parameter, selections that are different for each set from the plurality of sets of printed fabric pieces.

8. The method according to claim 1, wherein the printing medium is paper and the print is transferred to each fabric piece by sublimation.

9. The method according to claim 1, wherein the producer computer is further configured to receive an order by the customer.

10. The method according to claim 1, wherein the customer's design setting is transmitted to the customer to allow the latter to order in confirmation of this design setting.

11. A system for making a set of printed fabric pieces with fabric piece dimensions confined by respective cutting lines for use in an article of clothing, wherein the printed fabric pieces each are provided with a print having a print size corresponding, or nearly corresponding to one of (i) the dimensions of the respective printed fabric piece, and (ii) the dimensions of the respective printed fabric piece minus seam allowance, wherein at least some of said printed fabric pieces having said print sizes each are provided with a multi color print composed of a plurality of color areas, and wherein the set of printed fabric pieces comprises at least two fabric pieces provided with different multi color prints having different arrangements of color areas, the system comprising:
a producer computer operable to exchange data with a customer computer, the producer computer configured to transmit data that enable the customer to determine a design of the article of clothing by setting a plurality of design parameters and wherein the producer computer is further configured to receive data representing the plurality of design parameters selected by the customer, wherein the producer computer is further configured to transmit data to enable the customer to visualize a plurality of possible basic designs for the article of clothing, the basic designs having different configurations for the boundaries of the color areas within said multi color prints, wherein the producer computer is further configured to transmit data that further enable the customer to set a basic design by selecting the basic design from the plurality of possible basic designs, and wherein the producer computer is further configured to transmit data that further enable the customer to set colors for said prints, including colors for each of the plurality of color areas of said multi color prints by selecting from a plurality of possible colors, wherein the producer computer is further configured to transmit data that enable the customer to set a size of the article of clothing, the producer computer further configured to compile the received data representing the plurality of design parameters selected by the customer, including the data representing the basic design selected by the customer, the data representing the selected colors for said prints, including respective colors associated with the plurality of color areas of said multi color prints and the data representing the size selected by the customer, to establish a set of data representative of the design of the article of clothing;

a printing device coupled to the producer computer, the printing device configured to receive the set of data, and further configured to print a set of prints for the set of printed fabric pieces on a printing medium in accordance with the set of data received from the producer computer, printing being effected with the selected colors, including the selected colors for the color areas of said multi color prints, the printing being further effected to produce the print sizes corresponding, or nearly corresponding to one of (i) the dimensions of the respective printed fabric piece, and (ii) the dimensions of the respective printed fabric piece minus seam allowance, and the printing being further effected to produce the at least two different multi color prints having different arrangements of color areas, wherein the printing medium is one of (i) fabric, or (ii) an intermediate medium, from which said prints are then transferred to fabric; and a cutter configured to cut out fabric pieces for the set of printed fabric pieces either before or after the fabric pieces have been provided with said prints.

12. The system according to claim 11, wherein the printing medium is the intermediate medium, and wherein the system further comprises a station for print transfer from the intermediate medium to fabric.

13. The system according to claim 11, further comprising a station for sewing together a plurality of printed fabric pieces so as to form the article of clothing.

14. A computer system for making a set of printed fabric pieces with fabric piece dimensions confined by respective cutting lines, for use in an article of clothing, wherein the printed fabric pieces each are provided with a print having a print size corresponding, or nearly corresponding to one of (i) the dimensions of the respective printed fabric piece, and (ii) the dimensions of the respective printed fabric piece minus seam allowance, wherein at least some of said printed fabric pieces having said print sizes each are provided with a multi color print composed of a plurality of printed color areas, and wherein the set of printed fabric pieces comprises at least two fabric pieces provided with different multi color prints having different arrangements of color areas, the computer system comprising:

a producer computer operable to exchange data with a customer computer, the producer computer configured to transmit data that enable the customer to determine a design of the article of clothing by setting a plurality of design parameters, wherein the producer computer is further configured to receive data representing the plurality of design parameters selected by the customer, wherein the producer computer is further configured to transmit data to enable the customer to visualize a plurality of possible basic designs for the article of clothing, the basic designs having different configurations for the boundaries of the color areas within said multi color prints, wherein the producer computer is further configured to transmit data that further enable the customer to set a basic design by selecting the basic design from the plurality of possible basic designs, wherein the producer computer is further configured to receive data representing the basic design selected by the customer, wherein the producer computer is further configured to transmit data that further enable the customer to set colors for said prints, including colors for each of the plurality of color areas of said multi color prints by selecting from a plurality of possible colors, wherein the producer computer is further configured to receive data representing the selected colors for said prints, including respective colors associated with the plurality of color areas of said multi color prints, wherein the producer computer is further configured to transmit data that enable the customer to set a size of the article of clothing, wherein the producer computer is further configured to receive data representing the size selected by the customer, wherein the producer computer is further configured to compile the received data representing the plurality of design parameters selected by the customer, including the data representing the basic design selected by the customer, the data representing the colors selected b the customer, and the data representing the size selected by the customer, to establish a set of data representative of the design of the article of clothing for use in printing said prints for the set of printed fabric pieces on a printing medium, the printing being effected with the selected colors, including the selected colors for the color areas of said multi color prints, the printing being further effected to produce the print sizes corresponding, or nearly corresponding to one of (i) the dimensions of the respective printed fabric piece, and (ii) the respective printed fabric piece minus seam allowance, and the printing being further effected to produce the at least two different multi color prints having different arrangements of color areas, wherein the printing medium is one of (i) fabric, or (ii) an intermediate medium, from which the prints are then transferred to fabric.

15. The computer system according to claim 14, wherein the computer system is further operable to allow, for at least one additional design parameter beyond the basic design, the setting of a selection target with the aid of a graphical representation of several possible selection targets on a display.

16. The computer system according to claim 14, wherein the design parameters further comprise at least one of:
dimensions;
cut;
shape of neck opening;
type of collar;
wristband;
script object;
placement of script object;
typeface of script object;
logo;
placement of logo; or
type of fabric.

17. The computer system according to claim 14, further operable to utilize a space-saving arrangement of the set of prints on the printing medium.

18. The method of claim 1, wherein cutting out the fabric pieces comprises cutting out the fabric pieces by an automated cutter.

19. The method of claim 18, wherein the automated cutter is controlled by the set of data representative of the design of the article of clothing.

20. A method of making a set of printed fabric pieces with fabric piece dimensions confined by respective cutting lines for use in an article of clothing, wherein the printed fabric pieces each are provided with a print having a print size corresponding, or nearly corresponding to one of (i) the dimensions of the respective printed fabric piece, and (ii) the dimensions of the respective printed fabric piece minus seam allowance, wherein at least some of said printed fabric pieces having said print sizes each are provided with a multi color print composed of a plurality of printed color areas, and wherein the set of printed fabric pieces comprises at least two fabric pieces provided with different multi color prints having different arrangements of color areas, the method comprising:
- providing a producer computer and a customer computer, with the producer computer and the customer computer being connected for exchanging data;
- transmitting data, by the producer computer, wherein said data enable a customer to determine a design of the article of clothing by setting a plurality of design parameters;
- wherein setting a plurality of design parameters includes setting a basic design by selecting from the plurality of possible basic designs provided on a display device, the possible basic designs having different configurations for the boundaries of the color areas within said multi color prints;
- wherein setting a plurality of design parameters Maher includes setting colors for said prints including colors for each of the plurality of color areas of said multi color prints by selecting from a plurality of possible colors and associating the selected colors to said prints, including said multi color prints;
- wherein setting a plurality of design parameters further includes setting a size of the article of clothing;
- compiling the plurality of design parameters, as selected, to establish a set of data representative of the design of the article of clothing; and
- providing a printer and producing the set of printed fabric pieces by:
  - controlling the printer in accordance with the set of data, to print a set of prints for the set of printed fabric pieces on a printing medium, the printing including printing with the selected colors, the printing being further effected to produce the print sizes corresponding, or nearly corresponding to one of (i) the dimensions of the respective printed fabric piece, and (ii) the dimensions of the fabric piece minus seam allowance, and the priming being further effected to produce the at least two different multi color prints having different arrangements of color areas, wherein the printing medium is one of (i) fabric, or (ii) an intermediate medium, from which the prints are then transferred to the fabric; and
  - cutting out the fabric pieces for the set of fabric pieces either before or after the fabric pieces have been provided with said prints.

21. The method according to claim 20, further comprising sewing at least some of the fabric pieces together to form the article of clothing.

22. The method according to claim 20, wherein the printing medium is the fabric pieces to be sewn together to form the article of clothing.

23. The method according to claim 20, further comprising transmitting data to further enable, for at least one design parameter, a graphical representation to the customer on a display corresponding to what the article of clothing looks like with the respective selection for the at least one design parameter.

24. The method according to claim 20, wherein the design parameters further comprise at least one of:
- dimensions;
- cut;
- shape of neck opening;
- type of collar;
- wristband;
- script object;
- placement of script object;
- typeface of script object;
- logo;
- placement of logo; or
- type of fabric.

25. The method according to claim 20, wherein the act of providing a computer of a producer for exchanging data with a computer of a customer further comprises placing an order by the customer is effected via an internet connection.

26. The method according to claim 20, wherein the customer's design setting is transmitted to the customer to allow the latter to order in confirmation of this design setting.

27. The system according to claim 11, wherein the cutter is an automated cutter.

28. The system according to claim 27, wherein the automated cutter is controlled by the set of data representative of the design of the article of clothing.

29. The computer system according to claim 14, wherein the producer computer is operable to generate a graphics file from the set of data, the graphics file being adapted to be utilized as a basis for printing the set of prints on the printing medium.

30. The computer system according to claim 14, further comprising a cutting device coupled to the producer computer, the cutting device configured to cut out the fabric pieces for the set of fabric pieces from a fabric, the fabric being in one of the states before or after the set of prints have been printed on the fabric.

31. The computer system according to claim 30, wherein the cutting device is an automated cutter.

32. The computer system according to claim 31, wherein the automated cutter is controlled by the set of data representative of the design of the article of clothing.

33. The method according to claim 1, wherein printing is electronically controlled with respect to the prints.

34. The method according to claim 1, wherein printing is performed using an ink jet printer.

35. The system according to claim 11, wherein the printing device is electronically controlled with respect to the prints.

36. The system according to claim 11, wherein the printing device is an ink jet printer.

37. The method according to claim 20, wherein the printer is electronically controlled with respect to the prints.

38. The method according to claim 20, wherein the printer is an ink jet printer.

39. The method according to claim 1, wherein the article of clothing comprises the printed fabric pieces of said set of printed fabric pieces and further comprises at least one additional fabric piece.

40. The method according to claim 18, wherein the automated cutter is optically controlled on the basis of the outline of the respective print on the fabric.

41. The system according to claim 11, wherein the article of clothing comprises the primed fabric pieces of said set of primed fabric pieces and further comprises at least one additional fabric piece.

42. The system according to claim 27, wherein the automated cutter is optically controlled on the basis of the outline of the respective print on the fabric.

43. The computer system of claim 14, wherein the article of clothing comprises the printed fabric pieces of said set of printed fabric pieces and further comprises at least one additional fabric piece.

44. The computer system of claim 31, wherein the automated cutter is optically controlled on the basis of the outline of the respective print on the fabric.

45. The method of claim 20, wherein the article of clothing comprises the printed fabric pieces of said set of printed fabric pieces and further comprises at least one additional fabric piece.

46. The method of claim 20, wherein the cutting is performed by an automated cutter that is controlled by the set of data representative of the design of the article of clothing.

47. The method of claim 20, wherein the cutting is performed by an automated cutter that is optically controlled on the basis of the outline of the respective print on the fabric.

* * * * *